United States Patent
Andersen et al.

(10) Patent No.: US 7,345,859 B2
(45) Date of Patent: Mar. 18, 2008

(54) METHOD AND A CONTROL SYSTEM FOR STARTING A MOTOR

(75) Inventors: Mads Andersen, Odense SV (DK); Niels Pedersen, Soenderborg (DK); Rune Thomsen, Loegumkloster (DK); Henrik Joergensen, Graasten (DK)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 11/486,201

(22) Filed: Jul. 13, 2006

(65) Prior Publication Data

US 2007/0014056 A1   Jan. 18, 2007

(30) Foreign Application Priority Data

Jul. 15, 2005   (DK) .................. PA 2005 01042

(51) Int. Cl.
*H02H 7/08* (2006.01)
(52) U.S. Cl. ......................................... 361/23; 361/28
(58) Field of Classification Search ................. 361/28, 361/23; 318/102
See application file for complete search history.

(56) References Cited

U.S. PATENT DOCUMENTS

| | | | | |
|---|---|---|---|---|
| 3,317,802 A * | 5/1967 | Ogden | ........................ | 318/102 |
| 5,325,038 A * | 6/1994 | Banzai et al. | ................ | 320/135 |
| 5,350,992 A * | 9/1994 | Colter | ........................ | 318/807 |
| 5,502,365 A * | 3/1996 | Nanbu et al. | ................ | 318/798 |
| 5,506,487 A * | 4/1996 | Young et al. | ................ | 318/811 |
| 6,037,749 A * | 3/2000 | Parsonage | ................... | 320/132 |
| 6,242,891 B1 * | 6/2001 | Parsonage | ................... | 320/132 |
| 6,507,164 B1 | 1/2003 | Healey et al. | .............. | 318/599 |
| 6,563,287 B2 * | 5/2003 | Shepeck et al. | ........... | 318/778 |
| 2002/0047419 A1* | 4/2002 | Shimizu et al. | ............. | 310/120 |
| 2005/0134230 A1* | 6/2005 | Sato et al. | ................... | 320/136 |

FOREIGN PATENT DOCUMENTS

JP   2001122182   5/2001

\* cited by examiner

*Primary Examiner*—Lincoln Donovan
*Assistant Examiner*—Antony Paul
(74) *Attorney, Agent, or Firm*—McCormick, Paulding & Huber LLP

(57) ABSTRACT

A method for starting a battery driven motor, wherein an input voltage is measured continuously. In case the input voltage becomes smaller than a predefined minimum voltage the attempt to start the motor is stopped and the maximum permitted current level to be supplied from the battery to an electronic unit of the motor is lowered before the next attempt. This is repeated until the input voltage is larger than the minimum voltage and the motor is no longer in start-up mode. The method protects the battery from collapsing. The method is suitable for starting battery driven motors for driving compressors. The number of attempted start-up sequences may be counted and on the basis of this it may be determined that the battery is weak or that the wiring is misdimensioned. Furthermore, a control system for controlling starting of a motor.

10 Claims, 3 Drawing Sheets

METHOD AND A CONTROL SYSTEM FOR STARTING A MOTOR

CROSS-REFERENCE TO RELATED APPLICATIONS

Applicant hereby claims foreign priority benefits under U.S.C. § 119 from Danish Patent Application No. PA 2005 01042 filed on Jul. 15, 2005 the contents of which are incorporated by reference herein.

FIELD OF THE INVENTION

The present invention relates to a method and a control system for starting a motor, e.g. a motor for driving a compressor, by means of a battery. More particularly, the present invention relates to a method and a control system for starting a motor in a manner which protects the battery. The present invention is particularly suitable for movable applications, such as refrigerators positioned in vehicles or boats, etc.

BACKGROUND OF THE INVENTION

When a motor, such as a motor for driving a compressor, is powered by a battery it is normally required that the battery delivers maximum power, or at least very close to maximum power, during start-up of the motor. Such a start-up causes the battery voltage to drop, and it may even cause the battery voltage to become so low that there is a risk that the battery may collapse. It may also be the case that the battery is 'weak' and/or the wiring between the battery and the motor is not dimensioned in a correct manner, and in this case the voltage drop may have the effect that the motor is not started at all during the start-up. This is very undesirable.

SUMMARY OF THE INVENTION

It is an object of the invention to provide a method of starting a motor by means of a battery in a manner which protects the battery from collapsing.

It is a further object of the invention to provide a method of starting a motor by means of a battery in a manner which ensures that the motor is started, even if the battery is 'weak'.

It is an even further object of the invention to provide a control system for controlling starting of a motor by means of a battery, the control system being capable of protecting the battery from collapsing and of ensuring appropriate start of the motor.

According to a first aspect of the present invention, the above and other objects are fulfilled by providing a method of starting a motor, the method comprising the steps of:

1. connecting a battery to input terminals at an electronic unit controlling the motor, thereby supplying a current to the electronic unit from the battery, the electronic unit ensuring that the supplied current does not exceed a predefined maximum current, $I_{max}$,
2. at least substantially continuously measuring an input voltage, $V_{input}$, on the electronic unit input terminals, and comparing $V_{input}$ to a predefined minimum voltage, $V_{min}$,
3. in case $V_{input}$ becomes smaller than $V_{min}$, stopping the motor and waiting for a predefined time interval,
4. lowering the maximum permitted current level, $I_{max}$, to be supplied from the battery to the electronic unit, and
5. repeating steps 2-4 until it is obtained that $V_{input} \geq V_{min}$ and the motor is no longer in start-up mode.

The electronic unit as well as the motor itself are preferably powered by the battery. Thus, the motor will typically be a DC motor. Once the motor is running, i.e. it is no longer in start-up mode, the power drawn from the battery by the motor will decrease significantly. In many cases the power may be decreased to ⅓ of the power drawn during start-up. In some applications a generator will ensure recharging of the battery when the motor is running normally, thereby ensuring that the battery is sufficiently charged next time the motor needs to be started.

$V_{input}$ is measured on the input terminals at an electronic unit controlling the motor. Thus, the voltage which is measured is the voltage which is actually applied to the electronic unit as opposed to the voltage which is output from the battery. The voltage input to the electronic unit will typically be lower than the voltage output from the battery due to losses in the wiring connecting the battery and the electronic unit. The size of these losses may depend on the type of wiring and the distance between the battery and the electronic unit, i.e. on the length of the wiring. Alternatively or additionally, it may depend on whether or not any loose connections are present.

The measured input voltage, $V_{input}$, is compared to a predefined minimum voltage, $V_{min}$. This is typically performed by means of a microcontroller. Alternatively, it may be performed using a relatively simple set-up of comparators and resistors.

In case $V_{input}$ becomes smaller than $V_{min}$ the motor is stopped and a predefined time interval is allowed to elapse before another attempt to start the motor is initiated. During this time interval the maximum permitted current level, $I_{max}$, to be supplied from the battery to the electronic unit is lowered. Thereby the power supplied by the battery during the next attempt to start the motor is also lowered. It is assumed that the reason why $V_{input}$ drops below $V_{min}$ is that a too large current/power is drawn from the battery as compared to what the battery is in fact capable of delivering without risking that the battery collapses. This may be caused by wiring having wrong dimensions (e.g. insufficient cross section) or by a weak battery. Thus, in order to protect the battery, the start-up sequence is aborted if the input voltage drops below a certain critical value, and the current (and thus power) is limited to a lower value before the next attempt at starting the motor.

The predefined time interval may preferably be selected in such a way that sufficient time is allowed for electronic components in the electronic unit to cool down in case one or more components have become so hot that a proper start-up of the motor can not be performed. Alternatively or additionally, the predefined time interval may be selected in such a way that the output voltage of the battery is allowed to increase sufficiently to ensure that a new attempt to start the motor can be performed with a reasonable chance of success. The predefined time interval may be a fixed interval, i.e. a specific time interval is allowed to lapse each time a start-up sequence is stopped, or it may be a variable interval, i.e. the specific waiting time is set individually each time a start-up sequence is stopped, e.g. with due consideration to the measured input voltage, the number of previously attempted start-up sequences, etc. The predefined time interval may be within the interval 10 s to 300 s, such as within the interval 20 s to 200 s, such as within the interval 30 s to 100 s, such as approximately 60 s.

The lowering of the maximum permitted current level, $I_{max}$, to be supplied from the battery to the electronic unit may be performed by lowering the level with a specific amount each time the motor has been stopped. Alternatively, the lowering of $I_{max}$ may be performed by lowering the level with a specific percentage of the previous level each time the motor has been stopped. In this case $I_{max}$ may, each time the motor has been stopped, e.g., be lowered by a percentage within the interval 5% to 50%, such as within the interval 20% to 40%, such as 30% or 50%.

The current supplied from the battery to the electronic unit is preferably monitored by continuously measuring the voltage drop across a resistor in series with the electronic unit using the well known relationship between the voltage across a resistance and the current passing through it. This monitoring can be carried out by a microcontroller. Thereby it is monitored that the supplied current does not exceed $I_{max}$.

The attempts to start the motor are repeated until it is ascertained that the motor has been started properly without $V_{input}$ dropping below $V_{min}$. Thereby, according to the method of the present invention a successful start of the motor is ensured while protecting the battery from collapsing.

In the present context the term 'start-up mode' should be interpreted to mean the mode which the motor is in while it is starting up. Thus, the motor will no longer be in start-up mode when it is running normally. Thus, steps 2-4 of the method according to the first aspect of the invention are repeated as long as the motor is in start-up mode, and the repetition of the steps is stopped as soon as the motor is running normally, i.e. the motor has been started in an appropriate manner.

In summary, according to the method of the invention, an attempt to start the motor is stopped if the input voltage drops below a critical value, and there thereby is a risk that the battery will be damaged. However, attempts to start the motor are repeated until the motor is actually started appropriately. Thereby it is ensured that the motor is started, even if the battery is 'weak', and at the same time protection of the battery is provided.

In the present context a battery is considered to be 'weak' if it is not possible to start the motor during the majority of the attempted starts. Thus, a battery which delivers a voltage which is below a cut-out limit of the motor will in the present context be considered a 'weak' battery.

$V_{min}$ may advantageously be chosen as the minimum voltage required in order to protect the battery from collapsing. Alternatively, a larger value of $V_{min}$ may be chosen in order to even further ensure that $V_{input}$ does not drop to a critical level.

In the present context the term 'collapsing' should be interpreted to mean that the battery becomes discharged. However, $V_{min}$ could alternatively be chosen in such a way that the battery is protected from permanent damage, but not from becoming discharged.

The method may further comprise the step of counting the number of times steps 2-4 are repeated. Thus, in this embodiment, the number of attempted start-up sequences is counted.

In this case the method may further comprise the step of determining, on the basis of the counting step, whether or not there is a fault on the battery. Thus, in case many attempts are needed in order to obtain a successful start-up of the motor and/or in case it is necessary to lower the maximum current level supplied from the battery to the electronic unit to a very low level, it may be an indication that the battery (or one or more battery cells) maybe needs a replacement or needs to be recharged.

Alternatively or additionally the method may further comprise the step of determining, on the basis of the counting step, whether or not wiring between the battery and the electronic unit has been misdimensioned. Such a misdimensioning may, e.g., be wires which are too long, thereby introducing a voltage drop. However, a misdimensioning of the wiring is more often caused by wires having an insufficient cross section. Such wires will represent a significant resistance, and the voltage drop over the wires will consequently be so large that the electronic unit will not 'see' the actual battery voltage, but rather a voltage which is significantly lower (i.e. $V_{input}$ will be significantly lower than the actual battery voltage), and therefore the motor will not be allowed to start.

In the case it is discovered that the number of attempted start-up sequences is so high that it is determined that something is wrong, it will in most cases not be possible to readily determine whether the fault is due to a weak battery or misdimensioned wiring. Preferably the following happens. When the number of attempted start-up sequences exceeds a predefined level, a warning signal is sent to an operator. The warning signal may be visible, such as in the form of a flashing light, e.g. a diode, audible, or it may be of any other suitable kind. When the operator receives the warning signal, he or she will manually investigate the battery and the wiring in order to determine what causes the fault.

According to a second aspect of the present invention the above and other objects are fulfilled by providing a control system for controlling starting of a motor by means of a battery, the control system comprising:

means for at least substantially continuously measuring an input voltage, $V_{input}$, on input terminals of an electronic unit controlling the motor, the Input voltage being supplied by the battery, means for comparing $V_{input}$ to a predefined minimum voltage, $V_{min}$, means for generating a stop signal to the motor in response to an output from the comparing means, and in case $V_{input}$ becomes smaller than $V_{min}$, thereby stopping the motor, and means for controlling the maximum permitted current level, $I_{max}$, to be supplied from the battery to the electronic unit in response to the stop signal.

It should be understood that a skilled person would readily recognize that features described in relation to the first aspect of the invention may also be combined with the second aspect of the invention, and vice versa.

The means for measuring an input voltage may preferably be or comprise a voltmeter connected across the input terminals. The comparing means preferably is or comprises a microcontroller, but it may alternatively be or comprise a relatively simple set-up of comparators and resistors.

The means for controlling the maximum permitted current level may be or form part of a microcontroller.

The control system may further comprise means for counting a number of attempted start sequences. In the case that the means for controlling the maximum permitted current level is or forms part of a microcontroller, this microcontroller may also perform the counting. Alternatively, the counting may be performed by a separate microcontroller.

The control system may advantageously form part of a starter assembly for a motor. The motor may advantageously be adapted to drive a compressor, e.g. of the kind which forms part of a refrigeration system. Thus, the present invention is very suitably for battery driven, i.e. movable, compressor applications, in particular refrigerators located in vehicles, campers, boats, etc. Since such compressors are normally switched on and off regularly in order to obtain a desired refrigeration level, it is of particular interest to apply the method and control system of the present invention for these applications.

BRIEF DESCRIPTION OF THE DRAWINGS

The invention will now be described in more details with reference to the accompanying drawings in which.

DETAILED DESCRIPTION OF THE INVENTION

Figure 1:
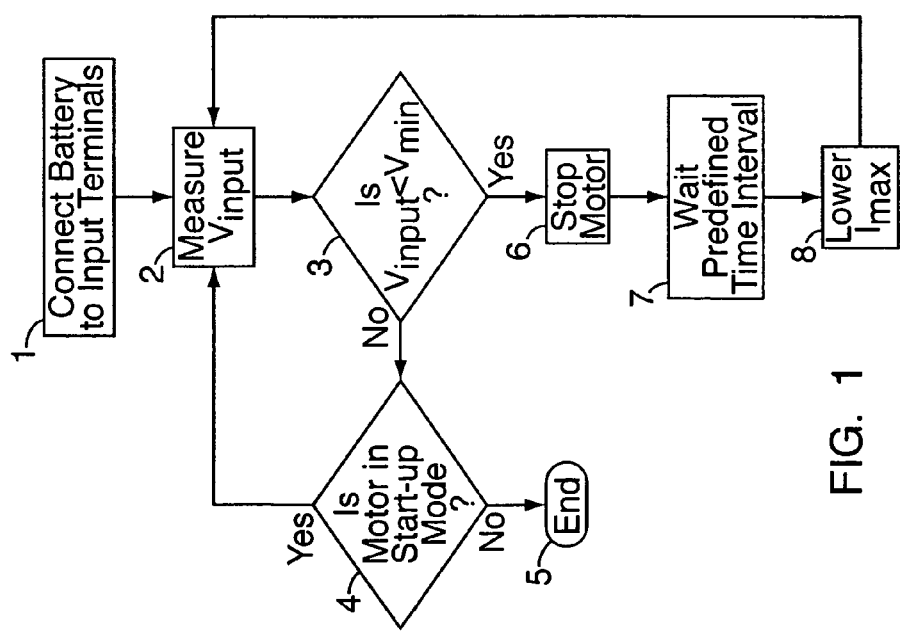
FIG. 1 is a flow chart illustrating the method according to the invention.

FIG. 1 is a flow chart illustrating the method according to the invention. Initially at 1 the battery is connected to the input terminals of the electronic unit controlling the motor. Subsequently, at 2, the input voltage, $V_{input}$, is measured across the input terminals, and at 3 $V_{input}$ is compared to a predefined minimum voltage, $V_{min}$. In case the comparison reveals that $V_{input} \geq V_{min}$ the process continues to 4 where it is investigated whether or not the motor is still in start-up mode. If the motor is still in start-up mode the process is returned to 2. If the motor is no longer in start-up mode the process is ended at 5.

If, at 3, it is determined that $V_{input} < V_{min}$ there is a danger that the battery may collapse, and therefore the motor is stopped at 6, a predefined time interval is allowed to elapse at 7, and the maximum permitted current level, $I_{max}$, to be supplied from the battery to the electronic unit is lowered at 8. Subsequently the process is returned to 2.

Thus, the flow chart of FIG. 1 illustrates a method in which $V_{input}$ is measured repeatedly in order to monitor whether or not it becomes smaller than $V_{min}$ before the motor has been started properly, i.e. as long as the motor is in start-up mode. If $V_{input}$ becomes too small, the motor is stopped and a new attempt to start the motor is initiated after $I_{max}$ has been lowered.

Figure 2:
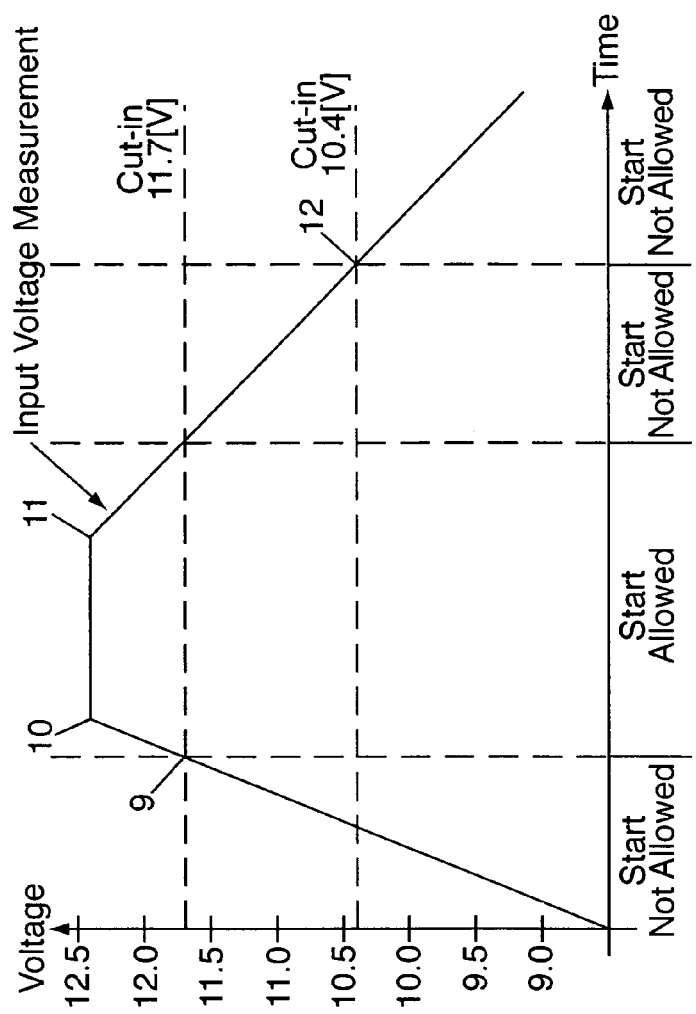
FIG. 2 is a graph showing a measured input voltage as a function of time during a start-up sequence.

FIG. 2 shows a measured input voltage, $V_{input}$, as a function of time during a start-up sequence. $V_{input}$ is measured across input terminals of an electronic unit controlling the motor to be started. In the example shown in FIG. 2 the motor drives a compressor. When the battery is initially connected to the input terminals $V_{input}$ is very low, and it is too low for a successful start of the compressor to be performed. Therefore, start-up is not attempted until $V_{input}$ is larger than a cut-in voltage 9 which in the present example is 11.7 V. However, when this voltage level has been reached, an attempt to start the compressor may be performed. In the example shown in FIG. 2 $V_{input}$ continues to increase until a stable voltage level 10 is reached. This voltage level is maintained until a start-up is attempted 11. The attempted start-up will cause $V_{input}$ to drop. Because the battery in the present example is weak, $V_{input}$ will continue to drop until it is below a cut-out voltage 12 which in the present example is 10.4 V. When this happens the attempted start-up of the compressor will be aborted in order to protect the battery.

Figure 3:
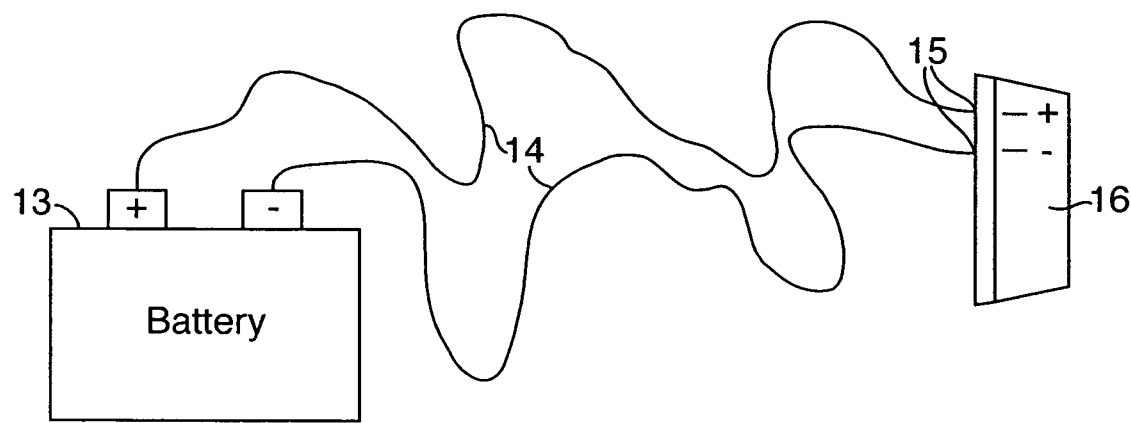
FIG. 3 shows a battery connected to input terminals of an electronic unit via misdimensioned wiring.

FIG. 3 shows a battery 13 connected via wiring 14 to input terminals 15 of an electronic unit 16. In FIG. 3 the wiring 14 is shown as very long wires in order to illustrate that the wiring 14 is misdimensioned. Another example of misdimensioned wiring 14 could be wires having an insufficient cross section. In case the wiring 14 is misdimensioned it may be difficult to supply a sufficient input voltage to the input terminals 15. This has been described above. Therefore it will probably be necessary to use several attempts in order to start the motor properly. Accordingly, by counting the number of attempted start-up sequences, it may be discovered that the wiring 14 is misdimensioned.

Figure 4:
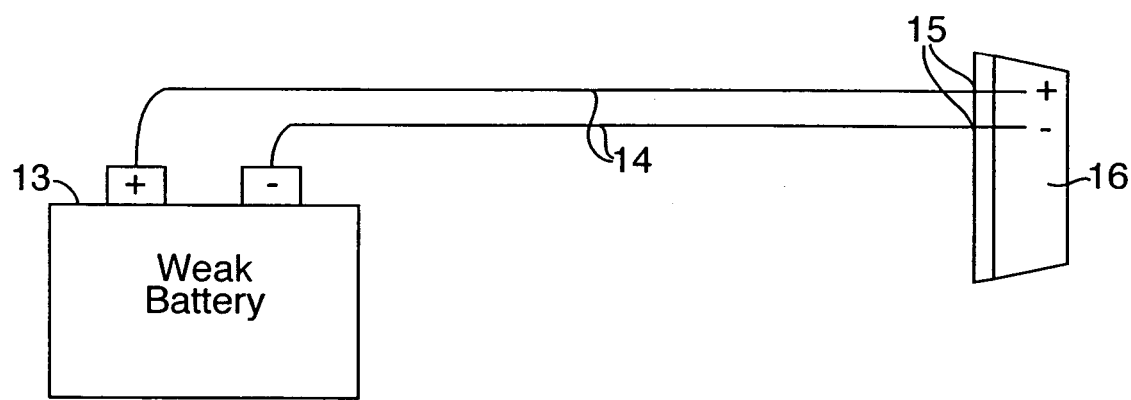
FIG. 4 shows a weak battery connected to input terminals of an electronic unit.

FIG. 4 also shows a battery 13 connected via wiring 14 to input terminals 15 of an electronic unit 16. In FIG. 4 the wiring 14 is dimensioned in a correct manner, but the battery 13 is weak. In this case it may also be difficult to supply a sufficient input voltage to the input terminals 15. Therefore, similarly to the situation described above, a weak battery 13 may be detected by counting the number of attempted start-up sequences.

Figure 5:
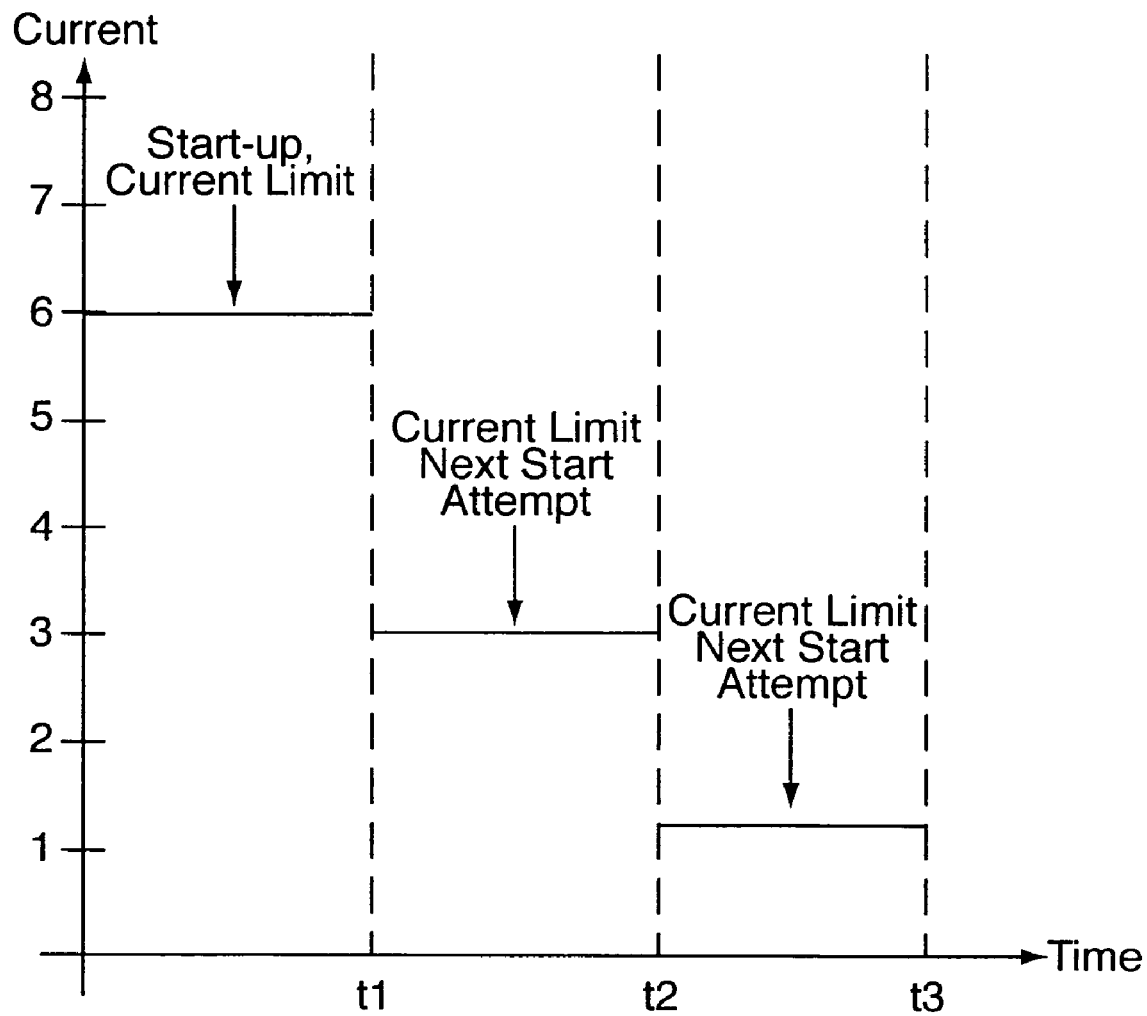
FIG. 5 is a graph showing a maximum permitted current level, $I_{max}$, to be supplied by the battery as a function of time during start-up of a motor.

FIG. 5 is a graph showing a maximum permitted current level, $I_{max}$, to be supplied by the battery as a function of time during start-up of a motor. Initially $I_{max}$ is set at a relatively high level. In the present example this level is 6 A. This first attempt to start the motor has to be aborted because the input voltage falls below a critical lower value as described above. As a consequence $I_{max}$ is lowered by 50% to 3 A at t1 before the next attempt to start the motor is initiated. However, this attempt is aborted like the first attempt, and as a consequence $I_{max}$ is once again lowered by 50% to 1.5 A at t2. If this maximum current level is not sufficiently low to ensure a proper start-up of the motor, $I_{max}$ may be lowered once again. This situation is, however, not illustrated in FIG. 5.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method of starting a motor, the method comprising the steps of:
    (a) connecting a battery to input terminals at an electronic unit controlling the motor, thereby supplying a current to the electronic unit from the battery, the electronic unit ensuring that the supplied current does not exceed a predefined maximum current, $I_{max}$;
    (b) at least substantially continuously measuring an input voltage, $V_{input}$, on the electronic unit input terminals, and comparing $V_{input}$ to a predefined minimum voltage, $V_{min}$;
    (c) in case $V_{input}$ becomes smaller than $V_{min}$, stopping the motor and waiting for a predefined time interval;
    (d) lowering the maximum permitted current level, $I_{max}$, to be supplied from the battery to the electronic unit; and
    (e) repeating steps (b) through (d) until it is obtained that $V_{input} \geq V_{min}$ and the motor is no longer in start-up mode.

2. The method according to claim 1, wherein $V_{min}$ is chosen as the minimum voltage required in order to protect the battery from collapsing.

3. The method according to claim 1, further comprising the step of counting the number of times steps (b) through (d) are repeated.

4. The method according to claim 3, further comprising the step of determining, on the basis of the counting step, whether or not there is a fault on the battery.

5. The method according to claim 3, further comprising the step of determining, on the basis of the counting step, whether or not wiring between the battery and the electronic unit has been misdimensioned.

6. A control system for controlling starting of a motor by means of a battery, the control system comprising:
   means for at least substantially continuously measuring an input voltage, $V_{input}$, on input terminals of an electronic unit controlling the motor, the input voltage being supplied by the battery,
   means for comparing $V_{input}$ to a predefined minimum voltage, $V_{min}$,
   means for generating a stop signal to the motor in response to an output from the comparing means, and in case $V_{input}$ becomes smaller than $V_{min}$, thereby stopping the motor, and
   means for controlling the maximum permitted current level, $I_{max}$, to be supplied from the battery to the electronic unit in response to the stop signal.

7. The control system according to claim 6, wherein the means for controlling the maximum current level is or forms part of a microcontroller.

8. The control system according to claim 6, further comprising means for counting a number of attempted start sequences.

9. A starter assembly for a motor, the starter assembly comprising a control system according to claim 6.

10. The starter assembly according to claim 9, wherein the motor is adapted to drive a compressor.

* * * * *